Patented Nov. 27, 1951

2,576,821

UNITED STATES PATENT OFFICE 2,576,821

TRANSPARENT, COLORLESS, COLOR-STABLE RESINS OF HALOACRYLIC COMPOUNDS

Carl E. Barnes, Belvidere, N. J., assignor to General Aniline & Film Corporation, New York, N. Y., a corporation of Delaware No Drawing. Application June 23, 1945, Serial No. 601,344

13 Claims. (Cl. 260—78.5)

This invention relates to the production of monomeric α-halogen substituted acrylic acids and their derivatives which are capable of yielding colorless polymers and to the color-free polymers from such acids and their derivatives. More particularly, the invention relates to the preparation of esters of α-chloracrylic acids, and especially methyl α-chloracrylate, which are capable of forming colorless polymers and to the color-free polymers obtained therefrom.

A great variety of α-halogen substituted acrylic compounds have been described in the art. The lower alkyl esters of α-halogen substituted acrylic acids are of particular interest since their polymers, especially that of methyl α-chloracrylate, possess outstanding hardness and a high softening point coupled with thermoplastic properties which render them highly desirable in the field of plastics. To obtain the highest degree of hardness in the polymer, it is necessary to heat the polymer at a temperature of above 100° C. for a considerable length of time. Unfortunately, this heating results in the formation of a strong yellow discoloration in the polymer. The discoloration also occurs when the polymer is permitted to stand at room temperature for any considerable length of time. The exposure of the polymer to ultraviolet light also results in a strong discoloration. As a result of the tendency of the polymer to discolor, its use as a plastic material has been seriously limited. For this reason, it finds no practical use as a substitute for glass, particularly in the field of optical glass, such as lenses, prisms, windows, and windshields.

Attempts to obtain a polymer from α-halogen substituted acrylic acids and their derivatives which are free from the tendency to discolor have heretofore proved to be unsuccessful. While various procedures for eliminating the tendency to discolor are proposed in the prior art, complete prevention of color is not obtained. Thus, in U. S. Patent 2,314,443, granted to Crawford, the discoloration of the polymer is stated to be due to the presence in the monomer of traces of so-called autooxidation products. In this patent, it is proposed to reduce the tendency to discolor by removing the autooxidation products, by distilling the monomer in a vacuum in the absence of oxygen and then carrying out the polymerization under anaerobic conditions. Another proposal made in this patent is to destroy the autooxidation products by use of various reducing agents or compounds having a labile oxygen atom. However, a polymer free from the tendency to discolor is not obtained as is pointed out in the patent. Thus, while diminution in color formation is obtained, the best polymer obtained is still discolored as measured by the Lovibond tintometer, having a color of red 0.3 Lovibond unit and of yellow 0.8 Lovibond unit.

In U. S. Patent 2,345,126, it is stated that while by practicing the process of U. S. Patent 2,314,443, considerable improvements are achieved in diminishing the extent of color formation in the polymer, complete suppression of the yellow color does not generally result. It is proposed in U. S. Patent 2,345,126 to further reduce this tendency to develop color. According to this patent, esters of α-haloacrylic acids which have been rendered substantially free from autooxidation products have added thereto a polyhydric alcohol or partial esters or ethers thereof as a stabilizer. In this patent, the least colored product obtained still has a total of 0.8 Lovibond unit when heated for 16 hours at a temperature of 100 to 110° C. and 1.4 Lovibond units when heated at the same temperature for 160 hours.

In U. S. Patent 2,247,790, granted to Strain et al., it is proposed to overcome the tendency to form color in the polymer by conducting the polymerization under substantially anhydrous conditions. However, while the patent states that a clear and water-white polymer is obtained, I have found that the polymer tends to discolor when heated for long periods of time or subjected to ultraviolet light.

It is an object of the present invention to provide compositions of monomers of α-halogen substituted acrylic acid compounds, and more particularly the esters, which yield polymers that are free from color and show no tendency to subsequently develop color when subjected to heat and/or ultraviolet light, or upon standing at ordinary room temperatures for extended periods of time.

It is a further object of the present invention to provide polymers of α-halogen substituted acrylic acid compounds, and more particularly the esters, which are color free and free from the tendency to become discolored when subjected to heat and/or ultraviolet light or upon standing for extended periods of time.

It is among the further objects to provide a method for producing the above-mentioned polymers, which eliminates the tendency of bubble formation, lowering of softening temperature, and decrease in surface hardness of the polymers.

According to copending U. S. application Serial

No. 601,342, filed June 23, 1945, now U. S. Patent 2,548,091, it has been determined that the cause of color formation in α-halogen substituted acrylic resins is due to the presence of oxalyl halide compounds, such as, for example, methyl oxalyl chloride in the case of methyl α-chloracrylate monomer. It is proposed therein to incorporate into the monomer any substance which in itself does not introduce color and which converts the oxalyl halide compound into a non-color forming compound, thereby resulting in a monomer capable of forming a colorless polymer.

According to my invention, I have found polymerizable esters of polyhydric alcohols, there being at least one free hydroxyl group present in the ester, to be effective agents for rendering inert the oxalyl halide present in the monomer and to result in a monomer capable of forming a colorless polymer.

According to my invention, the above objects are accomplished by incorporating in the monomeric α-halogen substituted acrylic acids or their derivatives a small amount of a polymerizable ester of a polyhydric alcohol, there being at least one free hydroxyl radical present in the ester, and subjecting the mixture to polymerization. Among suitable polymerizable esters of polyhydric alcohols are the partial esters of polyhydric alcohols with acids capable of forming interpolymers as, for example, acrylic and α-substituted acrylic acids. By the term "acids capable of forming interpolymers," I include acids which while not of themselves capable of polymerizing, form interpolymers as, for example, maleic, fumaric, angelic, and tiglic acids.

More specifically, examples of such partial esters are the monoesters as, for instance, ethylene, propylene, butylene, trimethylene, glycol monoacrylates, and the corresponding mono-α-chloracrylates, monomethacrylates, and similar mono- and poly partial esters of glycerol. Examples of partial esters of polyhydric alcohols with acids capable of forming interpolymers are the partial esters of maleic and fumaric acids which contain at least one free hydroxyl group as, for instance, diethylene glycol maleate having the following formula:

HOCH₂—CH₂—OOC—CH=
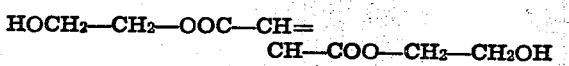
CH—COO—CH₂—CH₂OH diethylene glycol fumarate, diethylene glycol monoester of tiglic acid, and the similar esters of angelic acid.

The polymerizable ester of the polyhydric alcohol may be incorporated in the monomeric α-haloacrylic acid compound by simply dissolving it in the monomer before polymerization. Amounts as little as 0.1% based on the weight of the polymerizable compound are sufficient to prevent discoloration in the polymer under suitable conditions. In general, a small amount ranging from about 0.1 to 4% is effective for this purpose. The upper range is limited by the solubility of the ester in the monomer where a compatible homogeneous polymer having complete freedom from any cloudiness or milkiness is desired. Where cloudiness or milkiness is not a disadvantage, larger amounts than the range of 0.1% to the limit of solubility of the ester in the monomer may be used. However, I prefer to use those hydroxy polymerizable esters of polyhydric alcohols which are readily soluble and compatible with the polymer in amounts up to at least 0.1%. Following the incorporation of the ester in the monomer, the resulting composition may then be polymerized by any suitable polymerization process.

The present invention results in many advantages. Thus, it is unnecessary to carry out the polymerization of the monomer in the absence of air, or to take rigid precautions against hydrolysis. My process also make it unnecessary to remove or destroy the autooxidation products in the monomer as proposed in U. S. Patents 2,314,443 and 2,345,126. It becomes also unnecessary to utilize a freshly distilled monomer. Rigid precautions need not be taken to prevent exposure of the monomer to air either during storage or polymerization; nor is it necessary to dehydrate the monomer prior to distillation.

A special advantage obtained by the use of the polymerizable partial esters of polyhydric alcohols is that these compounds in addition to eliminating any tendency of the polymer to discolor also interpolymerize with the α-haloacrylic acid compound and, therefore, do not plasticize the finished polymer. Nor do they lower the softening temperature of the polymer or decrease the surface hardness thereof. Compounds which produce a plasticizing effect may be undesirable for many uses where high softening point, scratch resistance, and grindability are desired. Thus, my invention not only results in the elimination of the color, but also results in a polymer which is free from bubbles, has a high softening point, and unusual scratch resistance coupled with highly desirable machining and polishing characteristics.

In general, where a colorless moldable thermoplastic resin is desired, I prefer to use the monoesters of polyhydric alcohols with acids capable of forming interpolymers as, for example, ethylene glycol monoacrylate, ethylene glycol monomethacrylate, glycerol monomethacrylate, and the like. However, where it is desired to reduce the moldability of the resin to some extent at the same time increasing its softening temperature, surface hardness, grinding and polishing characteristics, I have found that the poly partial esters of polyhydroxy alcohols are most suitable to obtain a colorless resin having these properties.

Examples of such polymerizable poly partial esters are glycerol diacrylate, glycerol dimethacrylate, glycerol dichloracrylate, and the like. These esters, in addition to acting to eliminate the color in the resin also act as cross-linking agents and introduce a three-dimensional structure which reduces the moldability of the resin, increases its softening temperature, surface hardness, grinding and polishing characteristics.

The monomers which I use may be obtained by usual methods. It is preferred to purify the monomer prior to polymerization by the ordinary fractional distillation methods to remove as much of the various impurities therein as possible. Alpha-haloacrylic acids and their esters may, for example, be prepared by dehydrohalogenating α,α- or α,β-dihalopropionic acid or its esters. Thus, monomeric methyl α-chloracrylate may be prepared by dehydrochlorinating methyl α,α- or α,β-dichloropropionate.

The polymerizable polyhydric alcohol esters are equally effective in preventing discoloration of the polymer whether produced by thermal- or photo-polymerization methods. In accordance with my invention, for example, massive cast pieces of polymers of esters of α-haloacrylic acids may be made which possess exceptional clarity, transparency, and freedom from color and maintain these properties even upon exposure to ultraviolet light and/or elevated temperatures for extended periods of time.

The quantity of the polymerizable polyhydric alcohol ester added also depends to some extent upon the atmospheric oxygen with which the monomer is likely to come into contact during the polymerization. The addition of larger amounts of the polymerizable ester will allow the monomer to tolerate larger quantities of oxygen without the formation of color. Thus, for example, when larger amounts of the polymerizable ester are added to the monomer, polymerization may be carried out in vessels unsealed from the air and in which no especial effort is made to exclude air during the polymerization. Under these conditions, on the other hand, if the polymerizable hydroxy ester is omitted, a polymer is obtained which develops a strong yellow color upon heating and/or exposure to light or simply on standing under ordinary room conditions for an extended period of time. If the polymerization is carried out with more care in excluding air, correspondingly less of the organic ester need be added to the monomer.

The present invention is not only applicable for mass polymerization of α-haloacrylic acid compounds but is also effective to prevent the formation of color in the polymer produced by other methods as, for example, in the case where the polymerization is carried out in the presence of solvents for the monomer alone, or for the monomer and polymer, or in granular or in emulsion polymerization methods. Thus, the addition of a small amount of the polymerizable ester to the solution, or to the monomer in the case of granular polymerization, is highly effective for producing polymers which are free from the tendency to discolor.

The following examples are illustrative of my invention, the parts being by weight.

Example 1

To 100 parts of methyl α-chloracrylate were added 1.5 parts of ethylene glycol monoacrylate. The addition was effected by mixing the two without the exclusion of air, and the resulting mixture was polymerized in a glass tube sealed to prevent further contact with air. The polymerization was initiated by irradiated ultraviolet light at room temperature for 24 hours followed by heat at 65° C. for another 24-hour period after which the material was given a final baking at 120° C. for an additional 24 hours. At the end of this time, the glass was broken away from the resin and a hard, clear, colorless polymer was obtained. The polymer was thermoplastic and readily moldable at temperatures ranging from 140° to 170° C. A sample of the same methyl α-chloracrylate polymerized in the same way but without the addition of glycol monoacrylate had a distinct yellowish cast.

Example 2

Ethylene glycol monomethacrylate was substituted for the ethylene glycol monoacrylate in Example 1 and after polymerization in the same way, a hard, clear, colorless polymer was obtained, having an exceptionally high softening point. The polymer was thermoplastic and moldable. A sample of the same methyl α-chloracrylate polymerized in the same way but without the addition of ethylene glycol monomethyl acrylate had a distinct yellowish cast.

Example 3

4 parts of glycerol dimethacrylate were substituted for the ethylene glycol monoacrylate in Example 1 and polymerization effected in the same manner. The resulting polymer was found to be hard, clear, and colorless. It was found to possess exceptionally good grinding and polishing characteristics and although it was not thermoplastic, it could be deformed to a certain extent to make shaped articles at temperatures between 150 to 170° C. A sample of the same methyl α-chloracrylate polymerized in the same way but without the addition of glycerol dimethacrylate had a distinct yellowish cast.

Example 4

Two parts of ethylene glycol mono-α-chloracrylate were substituted for the ethylene glycol monoacrylate in Example 1 and after polymerizing in the same way, a hard, clear, colorless polymer was obtained. It had an unusually high softening point and was thermoplastic and moldable. A sample of the same methyl α-chloracrylate polymerized in the same way but without the addition of ethylene glycol mono-α-chloracrylate had a distinct yellowish cast.

Example 5

One part of glycerol di-α-chloracrylate was substituted for the ethylene glycol monoacrylate in Example 1 and polymerization effected in the same manner. The resulting polymer was found to be hard, clear, and colorless. It was found to possess exceptionally good grinding and polishing characteristics and although it was not thermoplastic, it could be deformed to a certain extent to make shaped articles at temperatures between 150 to 170° C. A sample of the same methyl α-chloracrylate polymerized in the same way but without the addition of glycerol di-α-chloracrylate had a distinct yellowish cast.

Example 6

Two parts of diethylene glycol maleate having the formula:

$$HOCH_2CH_2-OOC-CH=CH-COO-CH_2CH_2OH$$

were substituted for the ethylene glycol monoacrylate in Example 1 and after polymerizing in the same way, a hard, clear, colorless polymer was obtained with a high softening point. A sample of the same methyl α-chloracrylate polymerized in the same way but without the addition of the maleate had a distinct yellowish cast.

In each of the above examples, instead of initiating the polymerization at room temperature with ultraviolet rays, this may be done by first heating the mixture at about 35° C. to 65° C. for 24 hours, in the presence of a suitable catalyst added to the monomer as, for example, about 0.01% of benzoyl peroxide catalyst. The polymer may then be given the final baking treatment.

While the invention has been described in the specific examples in connection with the polymerization of methyl α-chloracrylate, it is also applicable to other α-halogen substituted acrylic acid compounds. By the term "α-halogen substituted acrylic acid compounds," I intend to include the esters, amides, substituted amides, and nitriles of haloacrylic acids, as well as the acids. Among examples of such compounds with which the present invention is effective in addition to that already disclosed in the examples may be mentioned: ethyl, propyl, butyl, phenyl, benzyl, cyclohexyl, allyl, and methallyl esters of α-chloroand α-bromacrylic acids; α-bromo- and α-chloramides or N-substituted derivatives thereof, such as α-chloracrylamide, N-methyl α-chloracrylamide, and the corresponding α-bromo compounds; and α-chloracrylonitrile and the like. In general, my invention has been found effective to eliminate color formation in polymers prepared from polymerizable α-halogen substituted acrylic acid compounds.

The temperature of polymerization may range from 20° C. or below to 120° C. or more, although the preferred range is approximately 35 to 65° C. The subsequent heating step in order to harden the polymer may range from 100 to 120° C. and the time from approximately 8 to 24 hours.

Either light or any suitable catalyst may be used to promote the polymerization in addition to benzoyl peroxide, such as, for example, succinyl peroxide, peracetic acid, and other peroxide- or oxygen-containing catalysts. The catalyst concentration may range approximately from about 0.01–0.5%.

Since it is apparent that the invention may be varied without departing from the spirit and scope thereof, it is to be understood that it is not limited to the specific embodiments above, which are given by way of illustration, but only in accordance with the appended claims.

I claim:

1. As a new composition of matter adapted to be mass polymerized to a transparent colorless color-stable resin, a composition consisting of a monomeric α-halogen substituted acrylic acid compound containing dissolved therein from 0.1 to 4% of a polymerizable free hydroxyl-containing partial ester of a polyhydric alcohol with an unsaturated acid, the amount of said polyhydric alcohol ester being within the limit of its solubility in the monomer, whereby the formation of color in the polymer is prevented.

2. As a new composition of matter adapted to be mass polymerized to a transparent colorless color-stable resin, a composition consisting of a monomeric α-halogen substituted acrylic acid ester containing dissolved therein from 0.1 to 4% of a polymerizable free hydroxyl-containing partial ester of a polyhydric alcohol with an unsaturated acid, the amount of said polyhydric alcohol ester being within the limit of its solubility in the monomer, whereby the formation of color in the polymer is prevented.

3. As a new composition of matter adapted to be mass polymerized to a transparent colorless color-stable resin, a composition consisting of monomeric methyl α-chloroacrylate containing dissolved therein from 0.1 to 4% of a polymerizable free hydroxyl-containing partial ester of a polyhydric alcohol with an unsaturated acid, the amount of said polyhydric alcohol ester being within the limit of its solubility in the monomer, whereby the formation of color in the polymer is prevented.

4. A method for the production of a transparent color-free color-stable polymer of an α-haloacrylic acid compound, which comprises subjecting to polymerizing influences, in mass polymerization, a composition consisting of a monomeric α-halogen substituted acrylic acid compound containing dissolved therein 0.1 to 4% of a polymerizable free hydroxyl-containing partial ester of a polyhydric alcohol with an unsaturated acid, the amount of said polyhydric alcohol ester being within the limit of its solubility in the monomer, whereby formation of color in the polymer is prevented.

5. A method for the production of a transparent color-free color-stable polymer of an α-haloacrylic acid ester, which comprises subjecting to polymerizing influences, in mass polymerization, a composition consisting of a monomeric α-halogen substituted acrylic acid ester containing dissolved therein from 0.1 to 4% of a polymerizable free hydroxyl-containing partial ester of a polyhydric alcohol with an unsaturated acid, the amount of said polyhydric alcohol ester being within the limit of its solubility in the monomer, whereby the formation of color in the polymer is prevented.

6. A method for the production of a transparent color-free color-stable polymer of an α-haloacrylic acid ester, which comprises subjecting to polymerizing influences, in mass polymerization, a composition consisting of a monomeric α-halogen substituted acrylic acid ester containing dissolved therein from 0.1 to 4% of a polymerizable free hydroxyl-containing monoester of a polyhydric alcohol with an unsaturated acid, the amount of said polyhydric alcohol ester being within the limit of its solubility in the monomer, whereby the formation of color in the polymer is prevented.

7. A method for the production of a transparent color-free color-stable polymer of an α-haloacrylic acid ester, which comprises subjecting to polymerizing influences, in mass polymerization, a composition consisting of a monomeric α-halogen substituted acrylic acid ester containing dissolved therein from 0.1 to 4% of a polymerizable free hydroxyl-containing polyester of a polyhydric alcohol with an unsaturated acid, the amount of said polyhydric alcohol ester being within the limit of its solubility in the monomer, whereby the formation of color in the polymer is prevented.

8. A method for the production of a transparent color-free color-stable polymer of methyl α-chloroacrylate, which comprises subjecting to polymerizing influences, in mass polymerization, a composition consisting of monomeric methyl α-chloroacrylate containing dissolved therein from 0.1 to 4% of a polymerizable free hydroxyl-containing partial ester of a polyhydric alcohol with an unsaturated acid, the amount of said polyhydric alcohol ester being within the limit of its solubility in the monomer, whereby the formation of color in the polymer is prevented.

9. A method for the production of a transparent color-free color-stable polymer of methyl α-chlorocrylate, which comprises subjecting to polymerizing influences, in mass polymerization, a composition consisting of methyl α-chloroacrylate containing dissolved therein from 0.1 to 4% of ethylene glycol monoacrylate, whereby the formation of color in the polymer is prevented.

10. A method for the production of a transparent color-free color-stable polymer of methyl α-chloroacrylate, which comprises subjecting to polymerizing influences, in mass polymerization, a composition consisting of methyl α-chloroacrylate containing dissolved therein from 0.1 to 4% of diethylene glycol maleate, whereby the formation of color in the polymer is prevented.

11. A method for the production of a transparent color-free color-stable polymer of methyl α-chloroacrylate, which comprises subjecting to polymerizing influences, in mass polymerization, a composition consisting of methyl α-chloroacrylate containing dissolved therein from 0.1 to 4% of glycerol dimethacrylate, whereby the formation of color in the polymer is prevented.

12. A colorless color-stable transparent mass polymer from a composition consisting of a polymerizable α-halogen substituted acrylic acid compound containing dissolved therein from 0.1 to 4% of a polymerizable free hydroxyl-containing partial ester of a polyhydric alcohol with an unsaturated acid, the amount of said polyhydric alcohol ester being within the limit of its solubility in said acrylic acid compound, whereby the formation of color in the polymer is prevented.

13. A colorless color-stable transparent mass polymer from a composition consisting of a polymerizable α-halogen substituted acrylic acid ester containing dissolved therein from 0.1 to 4% of a polymerizable free hydroxyl-containing partial ester of a polyhydric alcohol with an unsaturated acid, the amount of said polyhydric alcohol ester being within the limit of its solubility in said acrylic acid ester, whereby the formation of color in the polymer is prevented.

CARL E. BARNES.

REFERENCES CITED

The following references are of record in the file of this patent:

UNITED STATES PATENTS

| Number | Name | Date |
| --- | --- | --- |
| 2,308,236 | Pollack et al. | Jan. 12, 1943 |
| 2,337,681 | Pollack | Dec. 28, 1943 |
| 2,340,109 | D'Alelio | Jan. 25, 1944 |
| 2,340,111 | D'Alelio | Jan. 25, 1944 |